United States Patent [19]

Krishnan et al.

[11] Patent Number: 4,503,213

[45] Date of Patent: Mar. 5, 1985

[54] PROCESS FOR THE PREPARATION OF POLYCARBONATES HAVING N-ALKYL-PERFLUOROALKYL SULFONAMIDE TERMINAL GROUPS

[75] Inventors: Sivaram Krishnan; Dieter Neuray, both of New Martinsville, W. Va.; Wolfgang Cohnen, Leverkusen; Klaus Geisler, Bonn, both of Fed. Rep. of Germany

[73] Assignee: Bayer Aktiengesellschaft, Bayerwerk, Fed. Rep. of Germany

[21] Appl. No.: 506,189

[22] Filed: Jun. 21, 1983

[30] Foreign Application Priority Data

Jul. 10, 1982 [DE] Fed. Rep. of Germany ....... 3225884

[51] Int. Cl.³ .............................................. C08G 63/62
[52] U.S. Cl. ..................................... 528/199; 528/196; 528/198
[58] Field of Search ................................. 528/199, 196

[56] References Cited

U.S. PATENT DOCUMENTS

| | | | |
|---|---|---|---|
| 3,026,298 | 3/1962 | Lee et al. ............................... | 260/47 |
| 3,186,961 | 6/1965 | Sears ................................... | 260/30.4 |
| 3,775,367 | 11/1973 | Nouvertne ....................... | 260/45.9 R |
| 4,007,150 | 2/1977 | Adelmann et al. ............. | 260/30.8 R |
| 4,041,003 | 8/1977 | Adelmann et al. ............. | 260/30.8 R |
| 4,188,475 | 2/1980 | Margotte ............................. | 528/175 |
| 4,399,271 | 8/1983 | Sanderson ........................... | 528/172 |
| 4,471,104 | 9/1984 | Krishnan et al. .................... | 528/199 |

FOREIGN PATENT DOCUMENTS 2000515  1/1979  United Kingdom .

OTHER PUBLICATIONS

U.S. application Ser. No. 288,704, filed Jul. 30, 1981.

*Primary Examiner*—Harold D. Anderson
*Attorney, Agent, or Firm*—Gene Harsh; Lawrence S. Pope; Aron Preis

[57] ABSTRACT

The instant invention relates to a process for the preparation of linear aromatic polycarbonate resins by the known two-phase interfacial process and is directed to the use of perfluoroalkyl sulfonamides as chain stoppers in said process and is further directed to the polycarbonate resins obtainable by the process which resins are suitable in the preparation of thermoplastic molding compositions.

4 Claims, No Drawings

PROCESS FOR THE PREPARATION OF POLYCARBONATES HAVING N-ALKYL-PERFLUOROALKYL SULFONAMIDE TERMINAL GROUPS

SUMMARY OF THE INVENTION

The instant invention relates to a process for the preparation of aromatic polycarbonates having $\overline{M}w$ (weight average molecular weight) between 10,000 and 100,000 by the known two phase interfacial process from diphenols, chain stoppers and phosgene using known catalysts, solvents, alkali concentration and reaction temperatures, characterized in that at least some of said chain stoppers are N-alkyl-perfluoroalkyl sulfonamides and/or N-cycloalkyl-perfluoroalkyl sulfonamides and in that said sulfonamides are used in amounts of 1 mol % to 10 mol % preferably 2 mol % to 5 mol % relative to the moles of diphenols.

The instant invention relates also to aromatic polycarbonates obtainable by the process according to the above invention.

The instant invention relates also to polycarbonates characterized in that they conform structurally to the general formula (III)

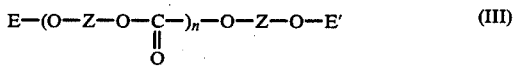

wherein E and E' independently are radicals of formula (IV)

wherein R'$_f$ is a perfluorinated alkyl, linear or branched, R is alkyl, linear or branched, saturated or unsaturated, or cycloalkyl, Z represents a divalent aromatic radical and "n" is the degree of polymerization associated with a weight average molecular weight $\overline{M}w$ of the aromatic polycarbonate of about 10,000 to about 100,000.

The products of this invention are found to possess improved reduced melt viscosity compared to polycarbonates (of identical molecular weight with similar heterogeneity Index) with monophenols only as chain terminators.

BACKGROUND OF THE INVENTION

In DAS No. 1,264,778 use of perfluoroaliphatic alcohols of general formula (I) as chain terminator in polycarbonate is mentioned.

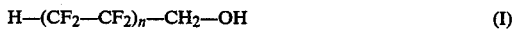

In U.S. Pat. Nos. 4,007,150 and 4,041,003 (LeA 16,235) use of perfluoroalkyl sulfonamides in the range of 0.001–1 wt % as additive to improve the mold release characteristics of polycarbonates have been mentioned. But no mention of improvement in reducing the melt viscosity of polycarbonate is made.

In U.S. Pat. No. 3,775,367 (LeA 12,278) use of perfluoroalkane sulfonic acid salts as additive to improve the flame retardant property of polycarbonate is mentioned, but no mention of the improvement in reducing the melt viscosity of polycarbonate is made.

U.S. patent application Ser. No. 288,704, filed July 30, 1981, now U.S. Pat. No. 4,399,271, is noted to disclose a copolycarbonate resin comprising units derived from a sulfonylamide characterized in its improved flame retardance.

DETAILED DESCRIPTION OF THE INVENTION

Thermoplastic aromatic polycarbonate molding compositions, preferably linear, are characterized in that their molecular weight range ($\overline{M}w$) is about 10,000–100,000 and in that at least some of their chain terminators are derived from N-alkyl-perfluoroalkyl sulfonamide of the general formula (II) exhibit reduced melt viscosity as compared to polycarbonates of identical molecular weight range having monophenols solely as chain terminator. Moreover, the inherent properties of polycarbonate are maintained when the polycarbonate is characterized in said terminations by N-alkyl-perfluoroalkyl sulfonamide.

The suitable chain terminators of formula (II) are N-alkyl perfluoroalkyl sulfonamides (II) where R'$_f$ is perfluorinated alkyl, linear or branched, and having preferably 1 to 20 carbon atoms, and where R is alkyl, linear or branched, saturated or unsaturated, and having preferably 1 to 20 carbon atoms, or cycloalkyl having preferably 5 to 6 carbon atoms.

The preferred N-alkyl-perfluoroalkyl sulfonamides are N-methyl-perfluorobutyl sulfonamide, N-methyl-perfluorooctyl sulfonamide, N-stearyl-perfluorobutyl sulfonamide, N-stearyl-perfluorooctyl sulfonamide, N-decyl-perfluorobutyl sulfonamide and N-oleyl-perfluorooctyl sulfonamide.

Monofunctional compounds, particularly monophenols may be used to compliment the sulfonamides of the invention as chain terminators.

The preferred aromatic polycarbonate of the present invention may be characterized by the general formula (III)

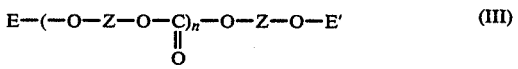

where R'$_f$ is C$_1$–C$_{20}$ perfluorinated alkyl, linear or branched and where R is C$_1$–C$_{20}$-alkyl, linear or branched or C$_5$–C$_6$-cycloalkyl.

In (III) Z represents a divalent aromatic radical, preferably with 6 to 30 carbon atoms, derived from diphenol of the formula (V)

and n is the degree of polymerization which is associated with a weight average molecular weight ($\overline{M}w$) of the aromatic polycarbonate of from about 10,000 to 100,000.

The preparation of polycarbonates by the interfacial process is known. The polycarbonates are obtained by reacting diphenols, in particular dihydroxy diarylalkanes or -cycloalkanes with phosgene; those dihydroxy diarylalkanes and cycloalkanes in which the aryl radicals are substituted in the ortho-position to the phenolic hydroxyl groups also being suitable in addition to unsubstituted dihydroxy diarylalkanes and -cycloalkanes. The known catalysts such as triethylamine and the customary solvents, reaction temperatures and amounts of alkali for the two-phase interface process are likewise known such as those taught in the book "Chemistry and Physics of Polycarbonates" by Hermann Schnell, Interscience Publishers, New York 1964.

The polycarbonates according to the invention may have molecular weights ($\overline{M}w$) of between about 10,000 and 100,000 preferably between 20,000 and 80,000 which may be determined from the relative viscosity of the polycarbonates (measured in $CH_2Cl_2$ at 25° C. and at a concentration of about 0.5 g per 100 ml).

Examples of suitable diphenols are hydroquinone, resorcinol, 4,4'-dihydroxydiphenyl, bis-(hydroxyphenyl)alkanes such as for example $C_1$-$C_8$ alkylene and $C_2$-$C_8$ alkylidene-bisphenols, bis-(hydroxyphenyl)-cycloalkanes, such as for example $C_5$-$C_6$-cycloalkylene and $C_5$-$C_6$-cycloalkylidenebisphenols and bis(hydroxyphenyl)-sulfides, -ethers, -ketones, -sulfoxides or -sulfones, furthermore $\alpha\alpha'$-bis(hydroxyphenyl)-diisopropylbenzenes and the corresponding nuclear alkylated and nuclear halogenated compounds.

Further diphenols suitable for the preparation of polycarbonates are described in U.S. Pat. Nos. 3,028,365, 3,148,172, 2,991,273, 3,271,367 and 2,999,846, all incorporated herein by reference and German Offenlegungsschriften Nos. (German published specifications) 2,063,050 (LeA 13,359), 2,063,052 (LeA 13,425), 2,211,957 (LeA 14,240) and 2,211,956 (LeA 14,249). Preferred diphenols are e.g. 2,2-bis(4-hydroxyphenyl-propane, 2,2-bis-(4-hydroxy-3,5-dimethyl)phenyl-propane, bis-(4-hydroxyphenyl)-methane, bis-(4-hydroxy-3,5-dimethylphenyl)-methane, bis-(4-hydroxyphenyl)-sulphide and bis-(4-hydroxyphenyl)-sulfone.

The halogenated diphenols are also useful in the practice of the invention such as 2,2-bis-(3,5-dichloro-4-hydroxyphenyl)-propane; 2,2-bis-(3,5-dibromo-4-hydroxyphenyl)-propane; 2,2-bis-(3-chloro-4-hydroxyphenyl)-propane; 2-(3,5-dichloro-4-hydroxyphenyl)-2-(4-hydroxyphenyl propane; 2,2-bis-(3-chloro-5-methyl-4-hydroxyphenyl)-propane; 2,2-bis-(3-brom-4-hydroxyphenyl)-propane and the like and are represented by the structural formula:

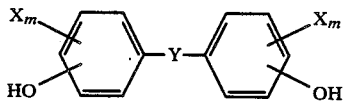

wherein Y is methylene or isopropylidene and X is halogen, preferably chlorine or bromine, and most preferably bromine, and m is 1 or 2. These halogenated diphenols are preferably used as comonomers in amounts of up to 10 mol % referred to the total molar amount of diphenols used.

The polycarbonates of the instant invention are characterized by their easy processability, a consequence of their reduced melt viscosity, and their excellent physical properties.

Because of the inherent high melt-viscosity of prior art polycarbonates that are characterized in that their molecular chains are terminated with monophenols only, their processing, i.e. molding, is carried out at temperatures higher than 315° C. Molds having complicated patterns or ones having thin cavities present particular difficulties, because the resin often stops its flow before the mold is completely filled and the operator electing to overcome this problem by raising the process temperature runs the risk of thermally degrading the resin.

The present invention offers an attractive solution to that problem in that the desirable properties of high molecular weight, linear polycarbonates are made available concurrent with reduced melt viscosity permitting processing at sufficiently low temperatures while using difficult and complicated molds.

The resins of the instant invention can be formed into shaped articles, test specimens, films etc. as well as for molding thin parts of Telefone F. 10 connectors and for video discs. There can be added in known manner stabilizers and fillers of various types, for example glass fibers or talc.

EXAMPLES

The following examples are intended to illustrate the subject of the invention in more detail. The indicated relative viscosity values have been determined using a solution of 0.5 gm of the indicated resin in 100 ml of methylene chloride at 25° C.

I. Comparison Examples

Polycarbonates With Phenol As Chain Terminator

A. About 45 parts by weight of 2,2-(4,4'-dihydroxydiphenyl)-propane and 6.20 parts by weight of phenol (3.2 mol %, in relation to the moles of bisphenol A) are suspended in 1.5 liters of water. The oxygen is removed from the reaction mixture in a three necked flask, provided with a stirrer and gas inlet tube, by passing nitrogen through the reaction mixture for 15 minutes, while stirring 355 parts by weight of 45% strength sodium hydroxide solution and 1000 parts by weight of methylene chloride are then added. The mixture is cooled to 25° C. While maintaining this temperature by cooling, 237 parts by weight of phosgene are added over a period of 120 minutes. An additional amount of 75 parts by weight of a 45% strength sodium hydroxide solution is added after 15–30 minutes or after the absorption of phosgene has started.

1.6 parts by weight of triethylamine are added to the solution formed and the mixture is stirred for a further 15 minutes. A highly viscous solution is obtained, the viscosity of which is regulated by adding methylene chloride. The aqueous phase is separated off. The organic phase is washed with water until free from salts and alkali. The polycarbonate is isolated from the washed solution and dried. The polycarbonate has a relative viscosity ($\eta$ rel) of 1.300. This corresponds approximately to a weight average molecular weight of about 31,000. The polycarbonate thus obtained is extruded and granulated.

B. From 433 parts by weight of bisphenol A (95.0 mol %) and 54 parts by weight of 2,2-bis-(4-hydroxy-3,5-dibromophenyl)-propane (5 mol %) and 6.2 parts by weight of phenol (3.2 mol %, in relation to the moles of the bisphenols) an aromatic polycarbonate is prepared according to Example A having a relative viscosity of 1.270.

C. From 453 parts by weight of bisphenol A (99.3 mol %), 2.4 parts by weight isatinbiscresol (3,3-bis-(4-hydroxy-3-methyl-phenyl)-2-oxo-2,3-dihydroindole) (0.7 mol %) and 6.2 parts by weight phenol (3.2 mol % relative to the moles of the bisphenol) an aromatic branched polycarbonate is prepared according to Example A having a relative viscosity of 1.320.

II. The Polycarbonates According to the Invention

D. From 453 parts by weight of bisphenol A (99.3 mol %), 2.4 parts by weight isatinbiscresol (0.7 mol %) and 20 parts by weight N-methyl-perflurobutylsulfonamide (3.2 mol % relative to the moles of the bisphenol) an aromatic branched polycarbonate is prepared according to Example A having a relative viscosity of 1.275.

E. A solution is prepared from 3.192 kg of 2,2-bis-(4-hydroxyphenyl)-propane (bisphenol A) (14 mols) 2.53 kg of 45% strength aqueous sodium hydroxide solution and 15 liters of distilled water. After adding 34 kg of methylene chloride, 140 g of N-methylperfluorobutyl sulfonamide (3.3 mol % relative to the moles of bisphenol) dissolved in 1 kg of methylene chloride are added at room temperature, while stirring 2.84 kg of phosgene is passed in at 20–25 min. The pH-value is kept at 13–14 during the phosgenation by adding a further 26.3 kg of 6.5% strength sodium hydroxide solution. 15 ml of triethylamine are then added and the mixture is further stirred for 30 minutes. The upper aqueous phase is then separated off and the organic phase is acidified and washed until free from electrolytes. The methylene chloride is then evaporated off and the polycarbonate is dried at 110° C. for 8 hours. The relative viscosity was determined to be 1.288.

F. From 433 parts by weight of bisphenol A (95 mol %) and 54 parts by weight of 2,2-bis-(4-hydroxy-3,5-dibromphenyl)-propane (5 mol %) and 20 parts by weight of N-methyl-perfluorbutylsulfonamide (3.2 mol % relative to the moles of bisphenols) as chain stopping agent an aromatic polycarbonate is prepared according to Example E having a relative viscosity of 1.260.

G. From 3192 parts by weight of bisphenol A and 230 parts by weight of N-methyl-perfluorooctylsulfonamide (3.3 mol % relative to the mols of the bisphenol) as chain stopping agent an aromatic polycarbonate is prepared according to Example E having a relative viscosity of 1.277.

of the polycarbonate measured in $CH_2Cl_2$ at 25° C. and at a concentration of about 0.5 gram per 100 milliliter, wherein reactants comprise at least one diphenol, phosgene and at least one chain terminator the improvement comprising reacting at least one chain terminator selected from the group consisting of N-alkyl-perfluoroalkyl sulfonamides and N-cycloalkyl-perfluoroalkyl sulfonamide in an amount of about 1 to 10 mol % relative to the mols of said diphenol, as a chain terminator.

2. The process of claim 1 wherein said amount is about 2 to about 5 mol percent.

3. A process for the preparation of an aromatic polycarbonate resin having a weight average molecular weight of 10,000 to 100,000, as determined from the relative viscosity of the polycarbonates measured in $CH_2Cl_2$ at 25° C. and at a concentration of about 0.5 gram per 100 milliliter, comprising reacting at least one aromatic dihydroxy compound with phosgene and at least one chain terminator characterized in that at least some of said terminator conform structurally to

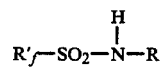

wherein $R'_f$ is a $C_1$–$C_{20}$ perfluorinated alkyl and R is a $C_1$–$C_{20}$ alkyl or a $C_5$–$C_6$ cycloalkyl.

4. An aromatic polycarbonate resin having a weight average molecular weight of about 10,000 to 100,000 as determined from the relative viscosity of the polycarbonate measured in $CH_2Cl_2$ at 25° C. and at a concentration of about 0.5 gram per 100 milliliters and a structure conforming to

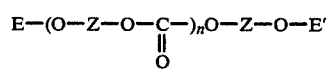

wherein E and E' independently are radicals conforming to

TABLE 1

| Example | Chain Stopper | BPA mol % | TBrBPA mol % | Branching Agent chain stopper mol %/mol % | η rel | Vicat B Temp. °C. | Melt Viscosity at 300° Pa.s shear rate (sec$^{-1}$) $10^1$ | $10^3$ |
|---|---|---|---|---|---|---|---|---|
| A | Phenol | 100 | — | —/3.2 | 1.300 | 148 | 550 | 390 |
| B | Phenol | 95 | 5 | —/3.2 | 1.270 | 153 | 620 | 350 |
| C | Phenol | 99.3 | — | 0.7/3.2 | 1.320 | 150 | 2000 | 400 |
| D | N—Methyl-per fluorobutyl-sulfonamide | 99.3 | — | 0.7/3.2 | 1.275 | 153 | 360 | 145 |
| E | N—Methyl-per-fluorobutyl-sulfonamide | 100 | — | —/3.3 | 1.288 | 151 | 260 | 90 |
| F | N—Methyl-per fluorobutyl-sulfonamide | 95 | 5 | —/3.2 | 1.260 | 153 | 370 | 180 |
| G | N—Methyl-per-fluorooctyl sulfonamide | 100 | — | —/3.3 | 1.277 | | 170 | 85 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In the two-phase interfacial process for the preparation of an aromatic polycarbonate resin having a weight average molecular weight between about 10,000 and 100,000, as determined from the relative viscosity

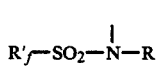

wherein $R'_f$ denotes a $C_1$–$C_{20}$ perfluorinated alkyl and R denotes a $C_1$–$C_{20}$ alkyl or a $C_5$–$C_6$ cycloalkyl and wherein Z denotes a divalent aromatic radical and n is the degree of polymerization corresponding with said weight average molecular weight.

* * * * *